(No Model.) 3 Sheets—Sheet 2.
W. H. FORCE & M. O. PARENTEAU.
METHOD OF AND MECHANISM FOR COVERING HEADS OF EYELETS.
No. 596,264. Patented Dec. 28, 1897.
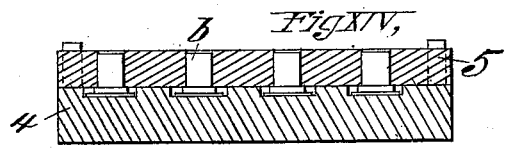
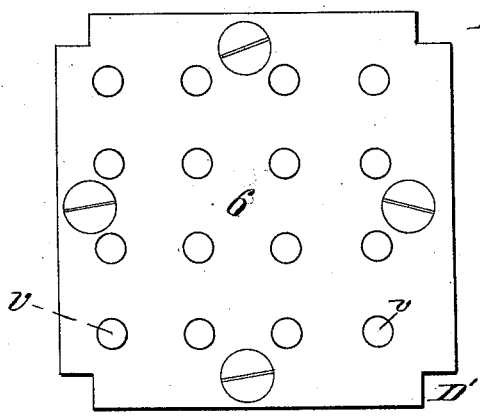
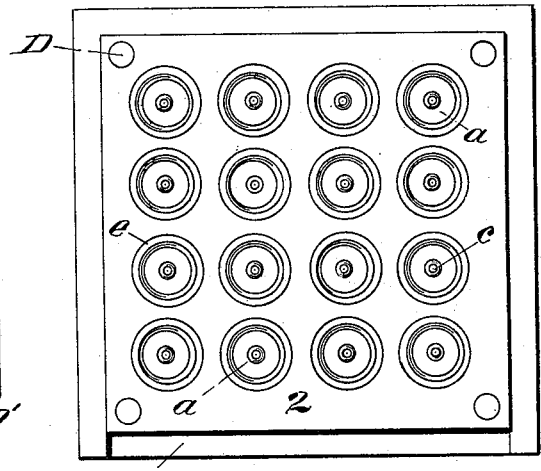
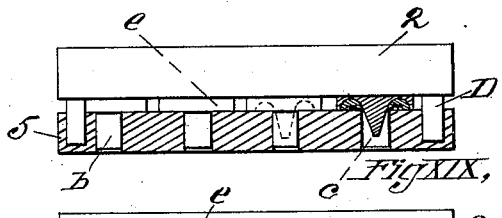
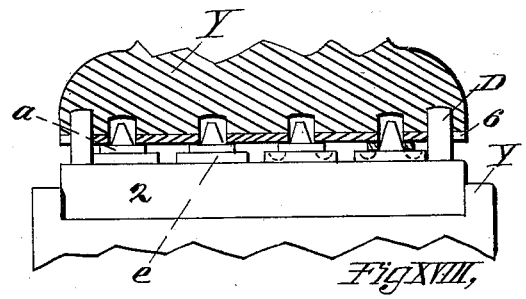
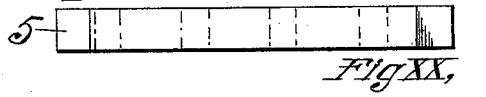
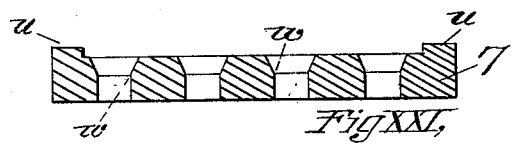
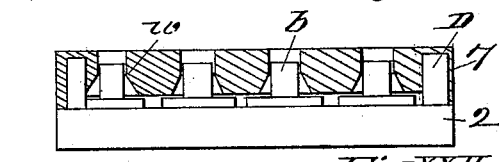
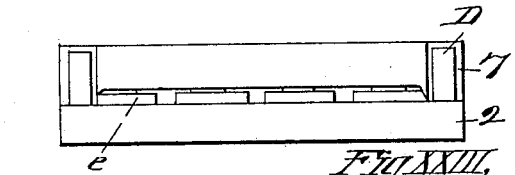
Witnesses: Inventors,
W. H. Force
M. O. Parenteau
by their attorney (No Model.) 3 Sheets—Sheet 3.
W. H. FORCE & M. O. PARENTEAU.
METHOD OF AND MECHANISM FOR COVERING HEADS OF EYELETS.
No. 596,264. Patented Dec. 28, 1897.
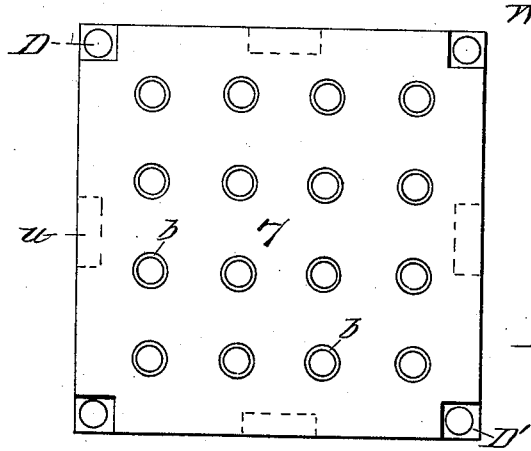
Fig XXIV.
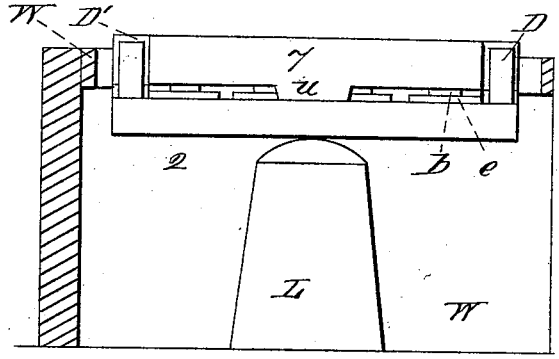
Fig XXV.
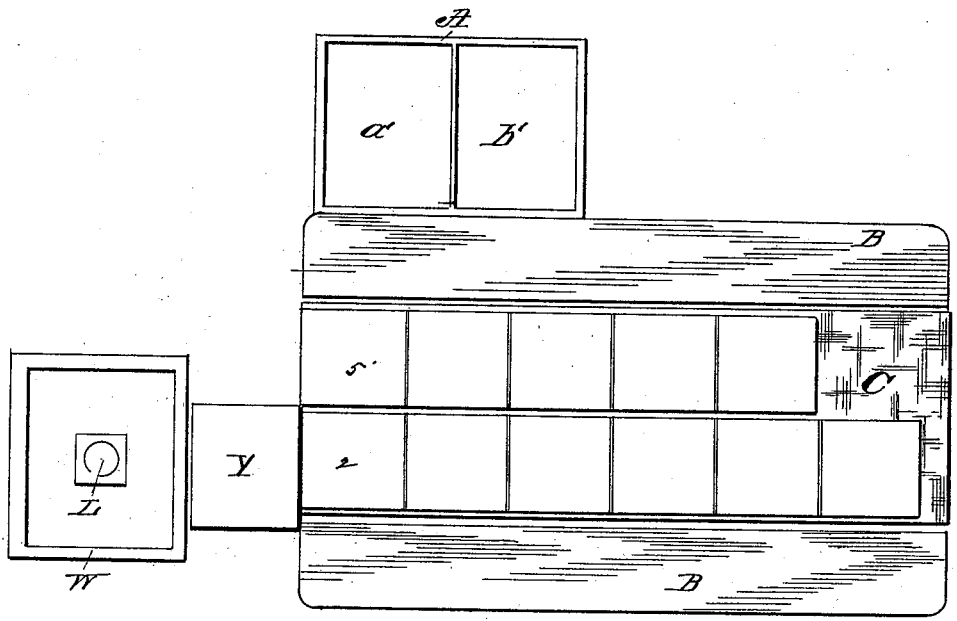
Fig XXVI.
Witnesses,
Inventors,
THE NORRIS PETERS CO., PHOTO-LITHO., WASHINGTON, D. C.

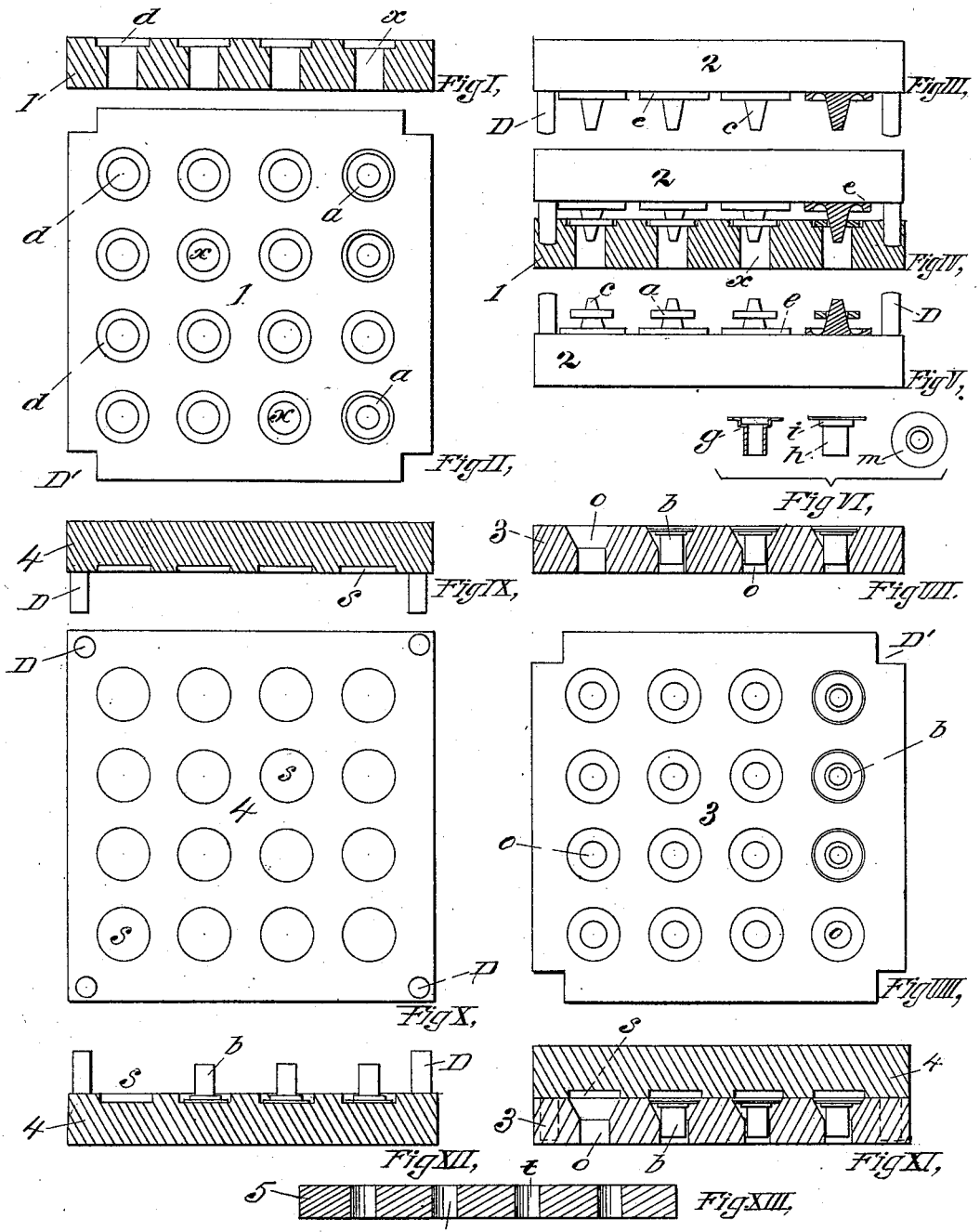

United States Patent Office.

WILLIAM H. FORCE AND MAXIME O. PARENTEAU, OF SPRINGFIELD, MASSACHUSETTS, ASSIGNORS OF ONE-THIRD TO ABIJAH D. CUTLER, OF SAME PLACE.

METHOD OF AND MECHANISM FOR COVERING HEADS OF EYELETS.

SPECIFICATION forming part of Letters Patent No. 596,264, dated December 28, 1897.

Application filed December 15, 1896. Serial No. 615,805. (No model.)

*To all whom it may concern:*

Be it known that we, WILLIAM H. FORCE and MAXIME O. PARENTEAU, citizens of the United States, residing at Springfield, Hampden county, State of Massachusetts, have invented certain new and useful Improvements in Methods of and Mechanism for Covering the Heads of Eyelets, of which the following is a specification.

Our invention relates to the method or process of covering the heads of eyelets with a plastic material and to the mechanism employed in carrying out this process.

Our invention is fully illustrated in the accompanying drawings, in which—

Figure I is a transverse section of the filler-plate. Fig. II is a top plan view of the same. Fig. III is a side elevation, in partial section, of the male-die plate. Fig. IV is a side elevation of the filler and male-die plates combined, with washers between them. Fig. V is a side elevation of the male-die plate reversed and combined with washers. Fig. VI is a view of the eyelet in plan, section, and elevation. Fig. VII is a transverse section of the eyelet-filling plate with eyelets therein. Fig. VIII is a top plan view of the eyelet-filling plate. Fig. IX is a transverse section of the transfer-plate. Fig. X is a plan view of one side of the transfer-plate. Fig. XI is a transverse section of the eyelet-filling plate and transfer-plate combined and inclosing eyelets. Fig. XII is a transverse section of the transfer-plate reversed and seating eyelets. Fig. XIII is a transverse section of the female-die plate. Fig. XIV is a transverse section of the transfer-plate and female die combined and inclosing eyelets. Fig. XV is a transverse section of the female die having eyelets seated therein. Fig. XVI is a plan view of the male die as shown in Fig. V and seated in the bed of a foot-press. Fig. XVII is a plan view of the presser-plate secured to the gate of a foot-press. Fig. XVIII is a partial sectional elevation of the male die containing washers and presser-plate combined in a foot-press. Fig. XIX is a partial sectional view of the male and female dies closed upon eyelets and washers. Fig. XX shows the same dies separated to leave the covered eyelets adhering to the male die. Fig. XXI is a transverse section of the knocker-plate. Fig. XXII shows the knocker-plate in section superimposed upon the male die containing covered eyelets. Fig. XXIII is a side elevation of the male die and knocker plate combined. Fig. XXIV is a top plan view of the knocker-plate in place upon the male die containing eyelets. Fig. XXV is a side elevation of the combined male die and knocker plate in the knocking-box, shown in partial section; and Fig. XXVI is a diagram showing the relative position of the tables, foot and hydraulic presses, and filling and knocking boxes.

Heretofore, as in our Patent No. 551,079, dated December 10, 1895, it has been shown how to assemble washers of plastic material and eyelets in male and female dies and to form the plastic heads on the eyelet by heat and pressure. In practice we have found much difficulty in carrying out the method set forth in said patent. In the present specification we set up the separate steps as now pursued by us, wherein the separate parts which go to make the completed eyelet are handled with facility, the washers being in the main carried by the male dies instead of by the female dies, as heretofore, so that a stripping of the surface from the plastic washer between the dies, which sometimes occurred by the old process, is now avoided.

As heretofore practiced, with the washer placed on the eyelet the heat which rendered the washer plastic was transmitted largely by the mold or female die to the eyelet and by the eyelet to the washer. This is objectionable, since the eyelet does not transmit heat readily, being partly out of contact with the die. The heat transmitted by the male die of the old method during the instant or slight interval of time in which the dies are in operation is somewhat uncertain and uneven, since the annular rim of the male die is liable to radiate heat faster than the central frustum, and the action of the dies is therefore somewhat uncertain.

By our present method the washers are seated on the conical male dies and tempered or slowly heated thereon and partially formed as to their ultimate faces before the washer is brought in contact with the eyelet. Then when the male and female dies are brought together, as hereinafter stated, the washer is held by the male die and is brought upon the eyelet. The entire washer is inclosed between the dies, while the plastic material is compelled to flow around the rim of the eyelet by the combined action of the male and female dies.

As a material which becomes plastic by heat we prefer celluloid, which comes from the manufacturers in sheets of the dimensions of twenty by fifty by .035 inches, with straight edges. With the material in this form and fed to a single power-press we are easily able to punch out three hundred thousand washers daily, which washers, of a thickness of .035 of an inch, contain the amount in each of the stock required for one eyelet-head.

The washers $a$ (shown in the drawings, together with the eyelets $b$, in enlarged view, for the sake of greater clearness) are carried in bulk of, say, one-half bushel from the punching-press to a filling-box A. (Shown in Fig. XXVI.)

The filling-box is divided into two compartments $a'$ and $b'$, the one $a'$ for the washers and the one $b'$ for the eyelets, so that they are in convenient proximity, the box A itself being, as shown, in easy reach of the mechanism for combining the washers and eyelets. Into the compartment $a'$ is introduced a washer filler-plate 1 in a cold condition, and washers by the handful are heaped upon its face. This plate 1, as shown in Figs. I, II, and IV, has holes $x$ through it and pockets $d$ about the size of the washers at the mouths of the holes regularly arranged in its face, the pockets having a depth equal to the thickness of the washer. By shaking plate 1 under the washers nearly all of the pockets will be filled. The few remaining unfilled can be quickly filled by hand. The filler-plate, full of washers, is placed upon the cold table B, (shown in Fig. XXVI,) and over it is dropped the male-die plate 2, register being provided for by the pins D in the plate 2 and corresponding sockets D' in plate 1. The male-die plate 2 consists of a rectangular piece of metal, having one plane surface. The other surface has a series of projecting cones or conic frustums $c$, arranged, preferably, in regular order and at such distance apart as the size of the eyelet requires. Around each cone or frustum $c$ there is an annular flange $e$, the flange projecting a less distance from the face of the plate than the cone or frustum and the space between said flange and cone or frustum preferably rounded, as shown in Fig. III and other views in the drawings. The male die 2, with cones or conic frustums corresponding in position to the washers in plate 1, when dropped over the cold washers, will have its cones $c$ pass through the central holes in the washers as far as the weight of the male die 2 will carry them, the unyielding walls of the cold washers arresting them, as shown in Figs. IV and V, before their flanges $e$ come in contact with the bottom side of the washer and so that the washers are removed by a space from the base of the cones. The two dies 1 and 2, so combined, and as shown in Fig. IV, are reversed on the table and the filler-plate die 1 is lifted off from die 2 to leave it, as shown in Fig. V, resting upon its plane surface with the cones or conic frustums projecting upward and with the washers upon the cones and removed from their base. The die 2 is now in this same position removed to the steam-table and placed thereon to be heated.

The eyelets $b$, of peculiar shape, as shown in Fig. VI and as shown in our Patent No. 550,958, dated December 10, 1895, consist of a tubular part $h$, a shoulder $g$ at the top of the tube for resting upon the face of the female die, and a collar $i$, joining the shoulder to the base of a flange $m$, presenting a flat surface at approximately right angles to the axis of the tube. The flat and extended surface thus presented by the flange $m$ acquires heat and conveys it uniformly to the entire under surface of the washer when brought in contact with the flange, so that a less degree of pressure or pressure exerted for a shorter period of time is required to mold the washer to the eyelet to form the covered head than was needed with eyelets of a different construction.

The eyelets when they come in bulk from the factory are placed about one-half bushel at a time in the filling-box A (shown in Fig. XXVI) in a compartment $b'$ therein, only separated from a similar one containing washers by a partition, each compartment $a'$ $b'$ being about one-half foot square, such size being sufficient to admit easily the eyelet-filling plate 3, as the adjacent compartment admitted the washer filler-plate 1.

The eyelet-filling plate 3 is a rectangular plate of metal flat on both sides and provided with holes $o$ of a size easily fitting the stems of the eyelets, so that the eyelets can drop into it by gravity, the number of holes and their relative position corresponding to the cones or frustums $c$ of the male die 2. The holes $o$ are provided with beveled mouths of slightly larger diameter in the face of the plate 3 than the diameter of the eyelet-flanges, so that an eyelet resting in the hole $o$ will have its flange a little below the face of the plate, as shown in Fig. VII, so that when surplus eyelets are brushed by the hand or shaken off from the plate in the operation of filling it no eyelet can catch upon the edge of the flange of an eyelet in the plate to disturb it in its position. The filling-plate 3 has dowel-sockets to secure register with a corresponding plate 4, hereinafter described. The filling-plate 3 is shaken under eyelets heaped upon its face to have its holes $o$ filled. The few sometimes remaining unfilled have eyelets dropped into them by hand. The filling-plate, itself cold and containing cold eyelets, is placed on the cold table B, and over it and in register is placed the transfer-plate 4.

The transfer-plate 4 is a rectangular metal plate with flat parallel sides, as shown in Figs. IX and X, with dowel-pins D from the face, and with the face provided with pockets $s$ of a diameter slightly larger than that of the flanges $m$ of the eyelets and of a depth sufficient to bring the shoulders $g$ of the eyelets flush with the face of the plate, or slightly below the face. This transfer-plate 4 in a cold condition, is brought over and into register with filling-plate 3, as shown in Fig. XI. These two plates are upon the table B reversed from their position, Fig. XI, and the filling-plate 3 is lifted off to leave the other plate 4 seated on its flat back, with the eyelets resting upon their flanges in pockets $s$ and with their tubes or stems projecting upward, as shown in Fig. XII. Upon transfer-plate 4 in the position shown in Fig. XII is placed to register with it, as shown in Fig. XIV, the female-die plate 5, which consists of a rectangular piece of metal with parallel plane sides and pierced with holes $t$, extending from side to side, spaced to correspond with the cones $c$ of the male-die plate 2, and of a diameter slightly larger than the tubes or stems $h$ of the eyelets, so as to admit them easily, the thickness of plate 5 being greater than the length of the eyelet-tube. These two plates 4 and 5 from the position shown in Fig. XIV are reversed and transfer-plate 4 is lifted off from plate 5 to leave the eyelets in plate 5, as shown in Fig. XV—that is, with their tubes in holes $t$ and their shoulders $g$ resting upon the face of plate 5 upon the perimeter of the holes and with their flanges clear above the face of the plate. The female-die plate 5 in the position shown in Fig. XV is now taken and seated upon the steam-table C to be heated with the eyelets therein.

When the male-die plate 2 was carried to the steam-table to be heated, it was placed upon the table at the far end from the hydraulic press, foot-press, and filling-box A, (shown in Fig. XXVI,) and at the same end of the steam-table and side by side with the male-die plate 2 the female-die plate 5 is now placed, and as each succeeding male-die plate and female-die plate are placed upon the steam-table those already on it are pushed up by hand toward the foot-press Y, which insures hot male and female dies, properly charged with washers and eyelets, in convenient reach of the operator of the presses and a constant succession of dies heating on the way to the point where they are to be combined. When a male-die plate, now sufficiently heated and carrying washers $a$, supported but not yet seated upon the cones or conic frustums $c$, has progressed to the mouth of the foot-press Y at one end of the table, it is slid into the bed of the press, as shown in Figs. XVI and XVIII, and a cold gate of the press or presser-plate 6 is brought down to seat the washers $a$ at the bases of the cones or conic frustums $c$ and immediately above the channels, as seen in Fig. XVIII.

The presser-plate consists of a rectangular metallic plate, which may have less thickness than any of the die-plates shown, and is provided with holes $v$ of slightly less diameter than the cones $c$ at their base, so that the sides of the cones may act as stops to regulate the distances to which the washers may be depressed upon the cones.

The presser-plate is secured by screws or other convenient means as a gate to the press, and is backed up preferably by wood or other substance not easily heated. Such backing is shown in section in Fig. XVIII, and holes cut in the backing in prolongation of holes $v$ give space for the cones $c$ when the press is closed. This press is operated by foot to seal the washers on the male-die plate 2, and it is regarded as important that the presser-plate should be cold; otherwise some of the washers would adhere to its surface and be withdrawn from the cones upon the opening of the press.

In using the term "cold" in the description of this specification it is intended as in contradistinction to the term "hot" applied to the dies heated upon the steam-table to a temperature high enough to melt or soften the plastic to a molding condition and is not meant to imply a temperature lower than that of the room.

When the male-die plate 2 is withdrawn from the press Y and the action of the presser-plate 6, it is combined with a female-die plate 5 and its eyelets $b$ in a heated condition by being placed over it in register therewith, and the two are placed in the hydraulic press (marked T in Fig. XXVI) and subjected to a pressure of about two thousand pounds to the square inch for the space of about a minute of time, at the close of which time the two die-plates are removed from the hydraulic press and being placed on the table B are separated by having the male-die plate lifted off from the female. The washers, by the action of the hydraulic press, were molded to form covered heads to the eyelets, and when the male-die plate is lifted from the female one, as shown in Fig. XX, the covered eyelets follow the male-die plate, the plastic heads adhering to the rounded channels which molded their tops, and the tubes $h$ projecting. It becomes now necessary to remove the covered eyelet from the male-die plate to which the eyelet adheres with tenacity, so that it would be a slow process to remove each one by hand, and to that end the male-die plate 2 is inverted from the position shown in Fig. XX to rest upon its back, as shown in Fig. XXII, with the tubes of the eyelets projecting upward, and over it is placed the knocker-plate 7.

The knocker-plate 7 consists of a rectangular piece of metal with a flat face on one side and a flat face on the other, with projecting shoulders or lugs $u$ upon the edges of the face. The plate 7 is provided with holes spaced to correspond with cones $c$ of the male die and having a diameter a little larger than the tubes $h$ of the eyelets. These holes have beveled or flaring mouths opening upon the face having the lugs $u$ and leaving shoulders $w$ where the mouths are joined to the cylindrical portion of the holes. Said shoulders $w$, when the plates are joined as in Fig. XXII, come opposite the free ends of the tubes $h$ of the eyelet. When the plates are together, as seen in Figs. XXII and XXIII, the lugs $u$ bear upon the face of the male-die plate to hold the face of the knocker-plate removed by a space from the flanges $e$ and from the plastic shoulders of the eyelets, so that there is room for the eyelets to be tipped upon the cones $c$. The sockets D' in the knocker-plate are, as shown in Fig. XXIV, larger than the dowel-pins D of the male-die plate, so as to allow a slight movement of the knocker-plate over the face of the male-die plate. The flaring mouths of holes $u$ and the sockets D' serve to bring the two plates into register, and when the two plates, the cold knocker-plate on top, are rested upon a post L to have the knocker-plate jarred against a hard surface—as a metal rim to a box W—the movement of the knocker-plate brings the shoulders $w$ against the ends of the eyelets and tips them loose from the cones $c$. The post L of metal presents a non-friction top, upon which to rest the surface of the male-die plate, so that it can be quickly rotated upon the post and slid thereon to jar each edge of the knocker-plate. When the knocker-plate 7 is lifted off from the male-die plate after having been subjected to the knocking process, all of the eyelets are loose, so that it is only necessary to invert the male die to have the eyelet fall into the box surrounding the knocker-post.

As sufficient to illustrate the invention the plates are shown as having a small number of dies; but in practice the plates each have over two hundred dies, and by this process and with our dies as constructed we can satisfactorily manipulate dies having a much larger number yet.

Now, having described our invention, what we claim is—

1. The method of covering the metallic heads of eyelets with plastic material, which consists in assembling washers having holes therein of such material in a filler-plate, applying a plate having male dies to said filler-plate so that the dies extend into the holes in the washers, reversing the dies so that the washers remain on the upwardly-projecting male dies, removing the filler-plate, then heating the male dies and tempering the washers thereon so that the washers will be securely attached to said dies when the said dies are reversed, then reversing the male dies, and compressing the heated or tempered washers from above on the heads of eyelets supported in the female dies beneath the said male dies, substantially as described.

2. The method of covering the metallic heads of eyelets with plastic material, which consists in assembling the eyelets in a series of female dies, the eyelet-heads projecting upwardly, heating the dies and eyelets therein, applying to the eyelets a corresponding number of plastic washers which are borne on male dies projecting downward from above, and forming the plastic heads on the metallic eyelet-heads by means of heat and pressure, all substantially as described.

3. In the art of covering the heads of metallic eyelets with plastic material, the method which consists in applying the washers to the upper face of the filler-plate, applying tapered male dies from above the washers, reversing the male-die plate and removing the filler-plate, then gradually heating the male dies so as to temper the washers and cause them to expand and conform to some extent to the tapering male dies.

4. In the art of covering the heads of metallic eyelets with plastic material, the method which consists in applying plastic washers to a number of tapering male dies, heating said dies and tempering the washers thereon, and pressing said washers toward the enlarged ends of said dies by a cold plate acting as a washer-seater.

5. In the art of covering the heads of metallic eyelets with plastic material, the method which consists in applying a washer of plastic material to an upwardly-projecting tapering male die, heating the die and washer and conforming the washer to the die so that it adheres thereto, then reversing the die with the washer still adhering, and afterward applying the die and washer from above to an eyelet, suitably held.

6. The method of covering the heads of metallic eyelets with plastic material, which consists in applying washers having holes therein and of plastic material to holes in the top of a filler-plate, then applying male dies from above to the holes in the washers, then reversing these dies with the washers thereon, removing the filler-plate, and heating the dies and washers, then forcing the washers toward the heads of the dies so they adhere to said dies; then reversing the dies and the washers adhering thereto, and bringing the male dies to the upper ends of heated female dies having the heads of eyelets projecting upward therein, and causing the plastic material to flow over the heads of the eyelets by heat and pressure, substantially as described.

7. The combination with the male-die plate having eyelet-holding dies, of the knocker-plate having holes corresponding in number and location to the dies, and having guiding and supporting surfaces which permit a lateral movement of the knocker-plate with reference to the male eyelet-holding dies, all substantially as described.

8. The knocker-plate having sockets in its sides, and having passages through the plate, each passage having a beveled opening leading from the face of the plate, said plate having shoulders or lugs at the edges of the working face which shoulders project beyond the plane of the face in which are the beveled mouths, all substantially as described.

9. The female-die plate having a backing of non-conducting material with recesses therein, and a thin metallic face-plate, with holes therein and in register with the holes in the backing and secured to said backing, combined with the male-die plate having frustoconical projections corresponding to the openings in the female-die plate, substantially as described.

WILLIAM H. FORCE.
MAXIME O. PARENTEAU.

Witnesses:
R. F. HYDE,
PENN TYLER.